United States Patent [19]
Hofmann

[11] Patent Number: 6,147,170
[45] Date of Patent: Nov. 14, 2000

[54] UV STABILIZED ETHYLENE COPOLYMERS

[75] Inventor: George Henry Hofmann, Wilmington, Del.

[73] Assignee: E. I. du Pont de Nemours and Company, Wilmington, Del.

[21] Appl. No.: 09/135,231

[22] Filed: Aug. 17, 1998

[51] Int. Cl.[7] .................... C08F 283/00; C08K 5/3472; C08K 5/132; C08K 5/107
[52] U.S. Cl. .................... 525/539; 525/281; 525/300; 525/304; 525/305; 524/89; 524/91; 524/291; 524/293
[58] Field of Search ................ 525/539, 281, 525/300, 304, 305; 524/89, 91, 291, 293

[56] References Cited

U.S. PATENT DOCUMENTS

| | | | |
|---|---|---|---|
| 3,780,140 | 12/1973 | Hammer | 260/884 |
| 4,123,585 | 10/1978 | Sparzak et al. | 428/379 |
| 4,528,311 | 7/1985 | Beard et al. | 524/91 |
| 5,494,885 | 2/1996 | Kudo et al. | 503/227 |
| 5,792,560 | 8/1998 | Friedman et al. | 428/441 |

FOREIGN PATENT DOCUMENTS

| | | |
|---|---|---|
| 0 288 124 | 10/1988 | European Pat. Off. . |
| 0 924 203 | 6/1999 | European Pat. Off. . |
| WO 97/01114 | 1/1997 | WIPO ............ G02B 1/04 |

OTHER PUBLICATIONS

Lucki, "Surface photografting of polymerizable benzotriazoles as UV stabilizers", Polymer vol. 31 p. 1772–1781; Sep. 1990 Sharma, "Structurally Bound Stabilizers", J. of Applied Polymer Science 27(7) p. 2605–2613; Jul. 1982.

Daniel E. Aultz, The Development of a Polymerisable Benzotriazole Stabiliser, *Speciality Chemicals*, 16, No. 2, 71, 73, 74, Mar./Apr. 1996.

*Primary Examiner*—David J. Buttner
*Attorney, Agent, or Firm*—Patricia L. Kelly

[57] ABSTRACT

A novel plasticizer composition is disclosed which comprises an ethylene copolymer combined with a reactive ultraviolet (UV) absorbing agent by reaction. Useful UV absorbing agents include homopolymers and copolymers of vinyl-functionalized monomer of benzotriazole, benzophenone, or benzophenolate. A process for preparing this novel plasticizer composition is also provided.

10 Claims, 4 Drawing Sheets

UV STABILIZED ETHYLENE COPOLYMERS

BACKGROUND OF THE INVENTION

1. Field of the Invention

The present invention relates to copolymers of ethylene, carbon monoxide, and one or more termonomers copolymerizable therewith to produce UV-stabilized plasticizers.

2. Description of Related Art

WO 97/01114 relates to contact and intra-ocular lenses containing absorbers of ultraviolet (UV) radiation and methods thereof, by polymerizing a mixture of vinyl monomers, initiators, cross-linking agent and polymerizable UV absorbers.

U.S. Pat. No. 5,494,885 discloses a protective layer transfer film comprising a substrate film and a resin layer which comprises copolymer of an UV-absorbing agent and at least one of acrylic monomers, oligomers, and reactive polymers.

U.S. Pat. No. 4,528,311 discloses optically clear UV-absorbing copolymer compositions comprising up to 20 weight percent of 2-hydroxy-5-acrylyoxyphenyl-2H-benzotriazoles for UV-adsorbing films that afford 85% absorption at 400 nanometers and 1 millimeter thickness, which may be added to other organic materials to impart ultraviolet absorbing properties thereto. Variations of the copolymers are described in Specialty Chemicals Vol. 16, No. 2, March/April 1996 as novel bondable stabilizers.

U.S. Pat. No. 3,780,140 relates to copolymers of ethylene/carbon monoxide/termonomer, and polymer blends formed therefrom for use as plasticizers in plastics such as polyvinyl chloride (PVC), nitrocellulose, etc. The ethylene copolymers are routinely used in PVC formulations for use in melt-processible rubbers, flexible PVC sheeting, pond liners, and membranes.

Traditionally, UV stabilizers are added to the formulations during the melt compounding step. UV stabilizers that absorb radiation in the 200 to 400 nm range are most frequently employed. The most frequently employed UV stabilizers are those of the substituted 2-hydroxybenzophenone and benzotriazole types, in sufficient concentration to provide adequate stability against exposure to UV light. The UV stabilizers are typically added to the formulation during the melt-compounding step, meaning that they are added to the mix in a mixer, extruder, or similar devices. As such, these stabilizers do not attach to the polymers such as through covalent bonding. Consequently, they are not permanent and can be lost through extraction, volatilization, or migration. Analysis of sample PVC-based rubber bulbs for use in portable gasoline cans, which failed prematurely by embrittlement during usage, showed that none of the originally added benzotriazole UV stabilizer originally added to the formulation was still present. It is assumed that the gasoline had extracted the stabilizer from the rubber bulbs, thus causing the premature failure.

Thus there is a need for UV stabilized ethylene copolymer compositions as plasticizers or in alloys and blends with other polymers, that are resistant to UV degradation and/or weathering even after extended periods of time in use.

SUMMARY OF THE INVENTION

Accordingly, the present invention provides a novel plasticizer composition comprising a copolymer of ethylene and carbon monoxide and a polymerizable ultraviolet radiation absorber of the benzotriazole type, the benzophenone type, or the benzophenolate type. The copolymer of ethylene and carbon monoxide is selected from a group consisting of: a) ethylene/alkyl acrylate/carbon monoxide copolymers; b) ethylene/vinyl acetate/carbon monoxide copolymers; c) ethylene/vinyl acetate/carbon monoxide copolymers grafted with carboxylic acid anhydride groups; and d) ethylene/alkyl acrylate/carbon monoxide copolymers grafted with carboxylic acid anhydride groups.

There is also provided a process for preparing a novel composition comprising a copolymer of ethylene and carbon monoxide and a polymerizable ultraviolet radiation absorber of benzotriazole type, benzophenone type, or benzophenolate type.

DETAILED DESCRIPTION OF PREFERRED EMBODIMENTS

Figure 1:
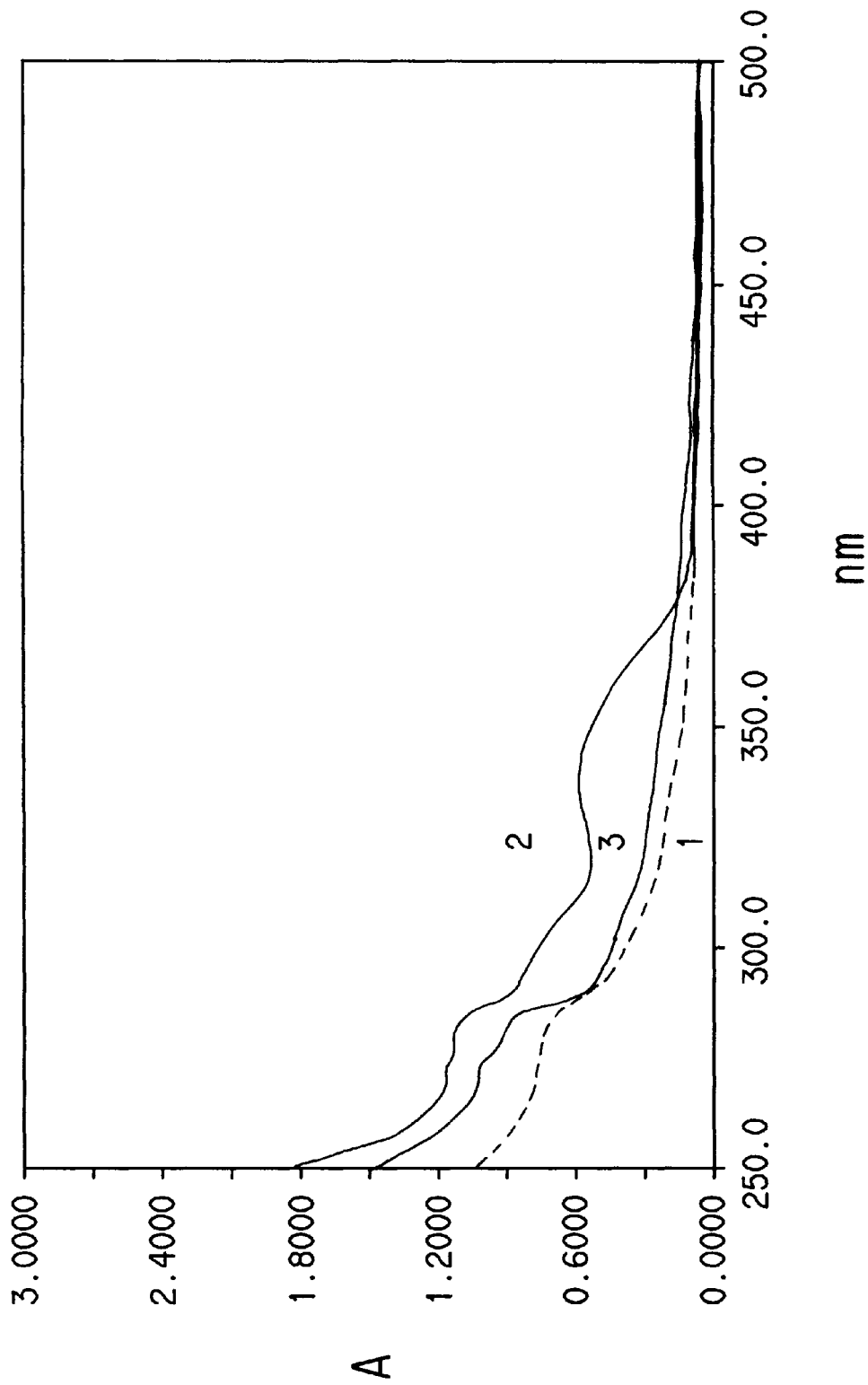
FIG. 1 shows the UV transmittance of the prior art UV stabilized ethylene copolymer composition.

The object of the invention is plasticizer compositions comprising an ethylene copolymer containing CO comonomers and an ethylenically unsaturated UV absorbing agent.

UV Absorbing Agents

The UV absorbing agent used in the present invention is one which is obtained by introducing an addition-polymerizable double bond such as a vinyl, acryloyl or methacryloyl group to a non-reactive UV absorbing agent of benzotriazole type, benzophenone type, benzophenolate type, etc., which is a conventionally-known organic UV absorbing agent. There is no specific limitation on the fundamental structure of the UV absorbers and UV absorbers having an unsaturated double bond employed. Examples of the benzophenone UV absorber having an unsaturated double bond include compounds having the following structure:

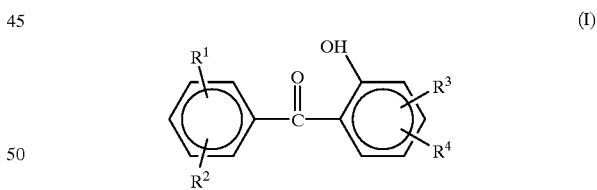

(I)

wherein at least one of $R^1$, $R^2$, $R^3$ and $R^4$ is an organic group having an unsaturated double bond (>C=C<), and the others are each independently a substituent group such as an alkyl group, an alkenyl group, an aralkyl group, an aryl group, an alkoxy group, an aralkoxy group, an allyloxy group, a hydroxy group, a halogeno group, a sulfonic acid group, an ester of a sulfonic acid group, a carboxylic acid group, an ester of a carboxylic acid group, acid group and an ester of a phosphoric acid group and are not specifically restricted.

Examples of the phenyl benzoate UV absorber having an unsaturated double bond include compounds having the following structure:

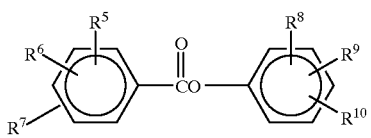

(II)

wherein at least one of $R^5$–$R^{10}$ is an organic group having an unsaturated double bond, and the others are each independently a substituent group such as an alkyl group, an alkenyl group, an aralkyl group, an aryl group, an alkoxy group, an aralkoxy group, an allyloxy group, a hydroxy group, a halogeno group, a sulfonic acid group, an ester of a sulfonic acid group, a carboxylic acid group, an ester of a carboxylic acid group, a phosphoric acid group and an ester a phosphoric acid group and are not specifically restricted.

Still furthermore, a preferred UV absorber is a benzotriazole UV absorber having an unsaturated double bond of the following structure:

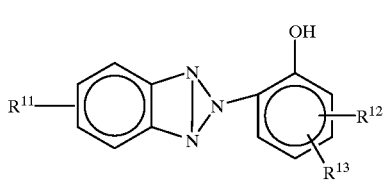

(III)

wherein at least one of $R^{11}$, $R^{12}$ and $R^{13}$ is an organic group having an unsaturated double bond, and the others are each independently a substituent group such as an alkyl group, an alkenyl group, an aralkyl group, an aryl group, an alkoxy group, an aralkoxy group, an allyloxy group, a hydroxy group, a halogeno group, a sulfonic acid group, an ester of a sulfonic acid group, a carboxylic acid group, an ester of a carboxylic acid group, a phosphoric acid group and an ester of a phosphoric acid group and are not specifically restricted.

Specific preferred unsaturated UV stabilizing compounds encompassed by the above formula (III) include a 2-Hydroxy-5-acryloxyalkylphenyl-2H-benzotriazoles of the structure:

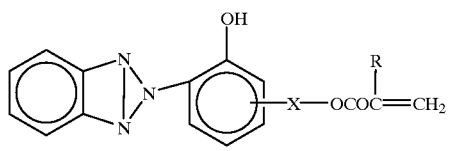

where R is H or $CH_3$, and X is —$CH_2CH_2$.

Ethylene Copolymer containing CO Momonomers

Examples of ethylene copolymer plasticizers for reacting with the above UV absorbing agents include: a) ethylene terpolymers of the general formula E/X/CO where E is the ethylene, X is a "softening" monomer such as, for example, vinyl acetate or an acrylic ester, and CO is the carbon monoxide functionality; and b) ethylene carbon monoxide-functional copolymer that is anhydride-modified in the form of E/X/CO/grafted MA, e.g., obtained by grafting reaction between the preformed copolymer with maleic acid or maleic anhydride.

Ethylene terpolymers of the general formula "E/X/CO" are plasticizers functionalized with carbon monoxide which enables a small amount of acetate, acrylate, or acrylic acid comonomer to be used. Preferred such polymers are ethylene/alkyl (meth) acrylate/carbon monoxide copolymer wherein the alkyl group can have the identities described above, e.g., a $C_1$–$C_{10}$ n-alkyl acrylate, such as E/nBA/CO terpolymers where nBA stands for n-butyl-acrylate. Also preferred are ethylene/vinyl acetate/carbon copolymers. Generally for these copolymers, the proportion of ethylene will be about 50 to 70 weight percent, the proportion of acid, acrylate, or acetate will be about 24 to 40 weight percent, and the proportion of carbon monoxide will be about 5 to 15 weight percent, to total 100 weight percent of the ethylene polymer. A process for manufacturing ethylene terpolymers is as described in U.S. Pat. Nos. 3,780,140 and 4,497,941.

The ethylene carboxyl and/or carbon monoxide-functional copolymer in the form of being anhydride-modified, i.e., "E/X/grafted MA" or "E/X/CO/grafted MA" contains carboxylic acid anhydride groups pendant from the polymer backbone. Anhydride modification typically is obtained by grafting reaction between the preformed copolymer with maleic acid or maleic anhydride monomers to form succinic anhydride groups on the copolymer by conventional procedures. The monomer is selected from the group consisting of ethylenically unsaturated carboxylic acids and ethylenically unsaturated carboxylic acid anhydrides, derivatives of such acids and ethylenically unsaturated hydrocarbons with other functional groups. Examples of the acids and anhydrides, which may be mono-,di- or polycarboxylic acids, are acrylic acid, methacrylic acid, maleic acid, fumaric acid, itaconic acid, crotonic acid, itaconic anhydride, maleic anhydride and substituted maleic anhydride, e.g. dimethylmaleic anhydride. Examples of the derivatives of the unsaturated acids are salts, amides, imides and esters e.g. mono- and disodium maleate, acrylamide, maleimide and diethyl fumarate. Examples of ethylenically unsaturated hydrocarbons with other functional groups are vinyl pyridines, vinyl silanes and unsaturated alcohols, e.g. 4-vinyl pyridine, vinyltriethoxysilane and allyl alcohol. Typically, the amount of anhydride modification will be about 0.1 to 5 weight percent based on the weight of the copolymer. Techniques for the grafting of such monomers are known, e.g., as described in U.S. Pat. No. 5,618,881 entitled "Compatibilizer Composition."

Various methods can be employed to facilitate the covalent bonding of the UV stabilizer to the polymer material, including a) copolymerization under application of heat or the like, optionally in the presence of a catalyst; and b) grafting via peroxide radical generation.

A. Copolymerizing UV Stabilizers

An especially practical copolymerization method involves a free-radical initiated, high pressure process, wherein the UV stabilizers and ethylene copolymers are fed into a large, continuously stirred reactor, normally in the absence of solvents, although occasionally the addition of a small amount of a suitable solvent helps avoid polymer deposit on the inner wall of the reactor. The reactor contains a mix of ethylene copolymer, unsaturated UV stabilizing compound and optionally additives in readily ascertainable proportions. The flow of UV stabilizing compound is adjusted to give a constant mole ratio, and the feed rate is set to be the same as the discharge of the polymer and of unchanged UV stabilizing compound from the reactor. Conversion can be directly measured by determining the amount of UV stabilizing compound present in the exit stream.

The free-radical polymerization catalyst employed in the copolymerization of the ethylenically unsaturated UV stabilizer in the present invention can be any of those commonly used in the polymerization of ethylene, such as the peroxides, the peresters, the azo compounds, or the percarbonates. The reactor is typically operated at a temperature of about 140–225° C., and a pressure of about 20,000–35,000 psi. The heat of polymerization is applied to heating up the cool feed UV stabilizer, so that a constant temperature is maintained in the reactor. The reactor pressure is reduced as the mixture of UV stabilizing monomers and copolymer exits the reactor and flows into a separator. Molten copolymer leaves the separator in a stream, from which it is cooled and further processed such as being cut into suitable sized particles.

B. Grafting UV Stabilizers to Ethylene Copolymers

The UV stabilizers of the present invention can be practically grafted onto polymers of ethylene and carbon monoxide by various well-known methods. One such method is in the presence of low level of organic peroxides as described in U.S. Pat. No. 4,612,155 entitled "Process for the grafting of monomers onto polyolefins." The organic peroxides used herein include hydroperoxides, especially a bis(tert. alkyl peroxy alkyl) benzene, dicumyl peroxide, or acetylenic diperoxy compound. Other organic peroxides are known to those skilled in the art, including t-butyl hydroperoxide and di-t-butyl peroxide. One preferred organic peroxide used in the process of the present invention is 2,5-Dimethyl-2,5 bis(tert. butyl peroxyisopropyl)benzene, available commercially as Vulcup® from Hercules Incorporated, which has a half-life at 150° C. of from about one minute to about 120 minutes. Another preferred organic peroxide is 2,5-dimethyl-2,5-di(t-butylperoxy)hexyne-3 which is available commercially as Lupersol® from Lucidol Division of Pennwalt Corporation.

The ethylene copolymer to be fed to an extruder for the grafting reaction is in the form of a composition of the general formula "E/X/CO" or the anhydride modified formula "E/X/grafted MA" or "E/X/CO/grafted MA." It should be noted that the anhydride modification reaction can also be taking place concurrently with the grafting of the ethylenically unsaturated UV stabilizer, with the maleic acid or maleic anhydride monomer being included in the admixture to the extruder containing an ethylene copolymer of the formula "E/X/CO." The ratio of the ethylene copolymer to the UV stabilizer monomer, and optionally maleic acid or maleic anhydride monomer may be varied over a wide range, particularly from about 99.8:0.1:0.1 to about 80:10:10. The ratio selected will depend on a variety of factors, including the amount of organic peroxide to be incorporated in the blend, the mixing capacity of the apparatus and the like. With regard to the mixing capabilities of the apparatus, twin-screw extruders may be more effective than single screw extruders. The amount of organic peroxide for the grafting of the UV stabilizer will depend on a number of factors: 1) the characteristics of the ethylene copolymer; 2) whether a concurrent anhydride modification reaction is to be carried out; and 3) the amount and nature of any additives in the ethylene copolymer such as antioxidants. However, the amount of organic peroxide should be in the range of 25–500 ppm based on the weight of the ethylene copolymer in the admixture fed to the extruder.

In the grafting process, the physical admixture of organic peroxide, ethylene copolymer, UV stabilizer and optionally the maleic acid or maleic anhydride monomer is fed to an extruder equipped with a mixing screw. The admixture is admixed in the extruder for less than a minute at a temperature above the melting point of the ethylene copolymer and the UV stabilizer/maleic acid or maleic anhydride monomer. This temperature should be such that the decomposition of the organic peroxide should be less than about 25% thereof. Information on the rate of decomposition of organic peroxides at various temperatures is available from the commercial supplier, and may be used in the selection of the organic peroxide and/or temperature profile of the extruder. The polymer admixture is then further heated in the second zone of the extruder for a period of time that is at least four times the half-life of the organic peroxide. Preferably the temperature of the polymer admixture in the second zone is in the range of 195–360° C. Under favorable conditions, particularly with low levels of antioxidant in the mix, the grafting yield of UV stabilizer and optionally with maleic acid or anhydride can be about 50–90%.

Examples of additives to be included in the copolymerization/grafting reaction between the ethylenically unsaturated UV stabilizer and the ethylene copolymers of the present invention include slip agents, antioxidants, anti-blocking agents, anti-static agents, mold release agents, pigments, nucleating or other processing aids and the like. Example of slip agents are erucamide and stearamide, of anti-static agents are bis(hydroxyethyl) tallow amine and glycerol monooleate, of anti-blocking agents are silica and mica and of mould release agents are calcium stearate and zinc stearate. Examples of nucleating agents or other processing aids are talc, silica, polyethylene glycol, fluorinated elastomers and polyolefin waxes, or the like. As noted above, stabilizing or other so-called non-reactive additives may have detrimental effects on the reaction and may be preferable not to use certain combinations of agents, as will be understood by those skilled in the art.

The particles of ethylene copolymer, the UV stabilizer, and optionally, the maleic acid or maleic anhydride monomer for the copolymerization/grafting reaction, may be in any convenient shape and size and may be for example be granules, powder, pellets or the like. Such forms may be commercially available forms of polymers and/or may be obtained by known techniques, e.g., grinding, melt pelletization and the like. In the grafting reaction, the organic peroxide may be in the form of a powder or liquid.

The present invention may be used to produce compositions of ethylene copolymers copolymerizable therewith UV stabilizers in the form of pellets or other shaped articles. The present invention is illustrated by the following examples without limiting its scope to them, with all parts, percentages and proportions are by weight unless otherwise indicated.

In all examples, a basic PVC powder blend was prepared consisting of: 100 parts PVC from Vista Chemical Company of Houston, Tex., under the trade name Vista® 5305, 4 parts Mark 1900 (an alkyl tin mercaptide manufactured by Argus Chemical), 1 part thioester anti-oxidant Seenox® 4125, 1 part hindered phenol anti-oxidant Irganox® 1098, and 3 parts lubricants Hoechst Wax E from Hoechst.

CONTROL EXAMPLES 1 AND 2

An E/nBA/CO ("EnBACO") terpolymer containing about 10 wt % carbon monoxide, 30 wt. % n-butyl-acrylate, and ethylene constituting the balance was prepared according to the general process and in the equipment described in U.S. Pat. No. 3,780,140. A benzotriazole-type UV stabilizer which does not include an unsaturated functional group capable of reacting with the ethylene copolymer was used as the UV absorber. This type of UV stabilizer is commercially available from BASF Corp. under the trade name Tinuvin® P.

Two PVC formulations were prepared from the PVC blend described above: 1) example 1 containing 11 parts EnBACO plasticizer blended with 0.11 parts Tinuvin® P UV stabilizer per 100 parts PVC; and 2) example 2 containing 11.11 parts EnBACO plasticizer without any UV stabilizer per 100 parts PVC. The formulations were mixed and tested as follows:

1. Mixing: Pre-weighed samples were charged using a quick loading chute to a Haake system 90 rheochord mixer set at 175° C. with cooling on zone 2 (bowl of mixer) at 60 RPM. The mixing was increased to 200 RPM and the samples were mixed for 1 minute after reaching a melt temperature of 190° C. Total mix time was approximately 3.5 min. The samples were removed hot from the mixing bowl and pressed between sheets of Teflon® in a cold press forming a pancake-like shape about 5 in. in diameter.

2. UV Testing. About 4 grams of sample was chopped in approximately ⅛ in. pieces and extracted in an extractor in hexane continuously for 4 days. Some of the samples were removed after the first and second days. Samples removed were pressed at 210° C. using thin-backing plates and Kapton release film at 4 min. pre-heat and 3 min. hold time, producing films with areas large enough for UV absorption tests of about 2 mils±0.2 mils. The films produced from samples before hexane extraction, one-day extracted, and two-day extracted were tested for UV absorption using a Perkin Elmer Lambda 19 UV/Vis Photospectrometer. Absorbance referenced against air by transmittance was measured.

FIG. 1 shows the UV absorption spectrum (at 340 nm) of the mixtures before and after hexane extraction. Curve 1 is the PVC/EnBACO blend without any stabilizer, which shows little absorption at 340 nm. Curve 2 shows the UV absorption at 340 nm for the PVC/UV-stabilizer blended EnBACO blend prior to hexane extraction. Curve 3 shows the UV absorption of the PVC UV-stabilizer blended E/nBA/CO after extraction. This curve shows considerable decrease of absorption of the same material after extraction, confirming the loss of UV stabilization after extraction.

COPOLYMERIZATION EXAMPLE 3

In example 3, an ethylene copolymer was an E/nBA/CO terpolymer containing about 10 wt % carbon monoxide, about 30 wt. % n-butyl-acrylate, and ethylene constituting the balance was prepared in a high-pressure unit (HPU) according to the general process and in the equipment described in U.S. Pat. No. 3,780,140. To this HPU was added 1 wt. % 2-(2'-hydroxy-5-methacrylyloxyethylphenyl)-2H-benzotriazole, an UV stabilizer capable of copolymerization with other vinyl monomers and available from Noramco, Inc. under the trade name Norbloc® 7966. The copolymerization reaction was carried out as described above.

An NMR method was developed to determine the level of copolymerized stabilizer which involved integrating the aromatic area of the UV stabilizer spectrum to determine the theoretical total methyl area for the stabilizer. The methyl peak of the unreacted stabilizer at 2.0 ppm on a 1 HNMR scale was used to arrive at the total area for the unreacted stabilizer, showing about 81–89% reaction. Liquid chromatography was also used to determine the level of unreacted stabilizer, confirming at least 80% yield obtained for the copolymerization reaction.

The molten polymer obtained from the high pressure reactor unit was cooled and quenched for use in a PVC formulation containing 11.11 parts of the polymer composition and 100 parts PVC. The formulation was subjected to refluxing hexane for two days, then subject to UV absorption tests as described above.

Figure 2:
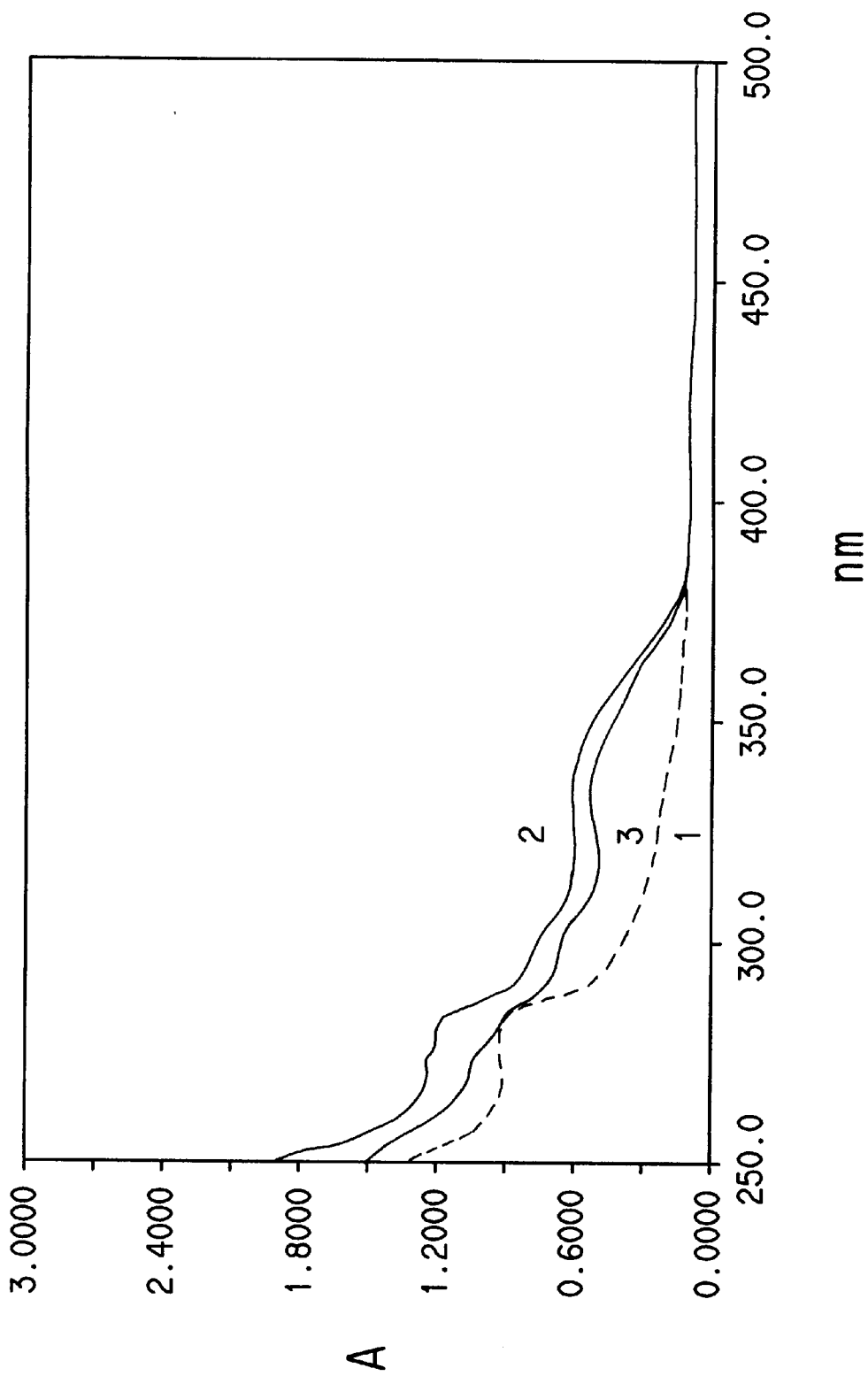
FIGS. 2 and 3 illustrate the efficacy of copolymers of this invention in abating transmission of UV radiation.

FIG. 2 shows the UV absorption spectrum (at 340 nm) of the mixtures before and after hexane extraction. Curve 1 is the PVC/EnBACO blend without any stabilizer with little absorption at 340 nm. Curve 2 shows the UV absorption at 340 nm for the PVCIUV-copolymerized EnBACO prior to hexane extraction. Curve 3 shows the UV absorption of the PVC/ UV-copolymerized EnBACO after extraction with most of the UV stabilizer remaining in the blend.

GRAFTING EXAMPLES 4–5

In Example 4, an admixture was prepared by mixing: a) 2 parts of an UV stabilizer capable of grafting with the ethylene copolymer; b) 0.6 part organic peroxide; and c) the balance an ethylene copolymer. The ethylene copolymer was an EnBACO terpolymer containing about 10 wt % carbon monoxide, about 30 wt. % n-butyl-acrylate, and ethylene constituting the balance, prepared according to the general process and in the equipment described in U.S. Pat. No. 3,780,140. The organic peroxide used was 1,1-DI(t-butylperoxy) 3,3,5-trimethylcyclohexane, commercially available from Pennwalt Corporation under the trade name Lupersol® 231. The UV stabilizer was of a benzotriazole type, a methacrylate ester capable of copolymerization with other vinyl monomers, commercially available from Noramco under the trade name Norbloc® 7966.

The resultant admixture was added to a Haake mixer and mixed at a temperature of about 225° C. at maximum 200 RPM setting for about 1–2 min. The molten graft polymer thus obtained was then removed from the mixer and cooled for use in a PVC formulation. Liquid chromatography technique was used to determine the amount of grafting of about 85%, which was comparable to the incorporation level obtained in copolymerization.

The composition of Example 4, EnBACO plasticizer grafted with Norbloc® 7966 UV stabilizer, was used in a PVC formulation containing 11.11 parts of the composition and 100 parts PVC. The formulation was subjected to refluxing hexane for two days then subject to UV absorption tests.

Figure 3:
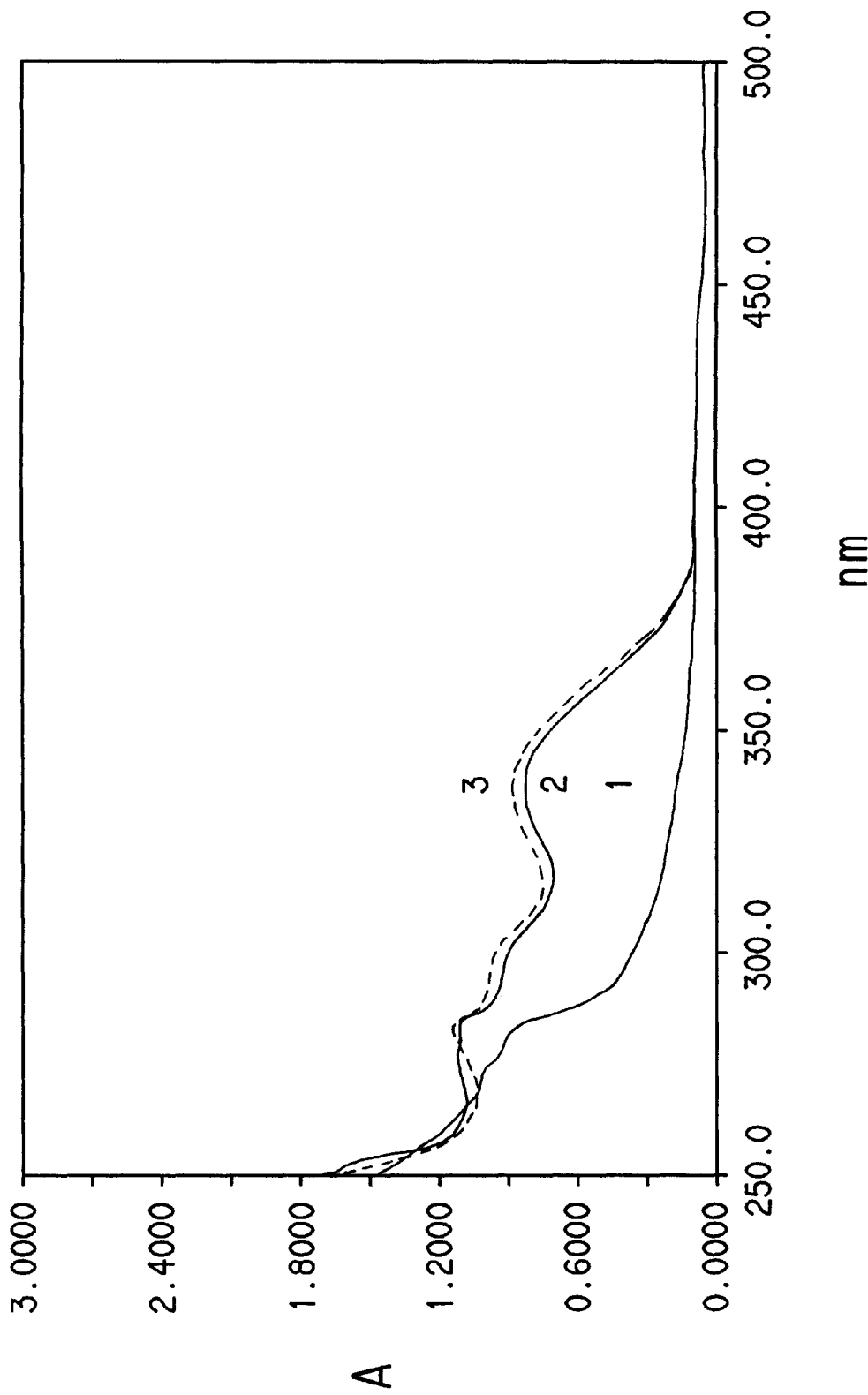

FIG. 3 shows the UV absorption spectrum (at 340 nm) of the mixtures before and after hexane extraction. Curve 1 is the PVC/EnBACO blend without any stabilizer, which shows little absorption at 340 nm. Curve 2 shows the UV absorption at 340 nm for the PVC/IJV-grafted EnBACO blend prior to hexane extraction. Curve 3 shows the UV absorption of the PVC/UV-grafted EnBACO blend after extraction. Again, as in the copolymerized case, essentially none of the grafted UV stabilizer is extracted in hexane as indicated by the retention of absorbance at 340 nm.

In Example 5, about 15 parts liquid PVC plasticizer comprising a monomeric phthalate ester, diisononyl phthalate (DINP) from Monsato Company, was added to the Example 4 admixture of: a) 2 parts Norbloc® 7966; b) 0.6 part Lupersol® 231, an organic peroxide; and c) the balance an E/nBA/CO terpolymer containing about 10 wt % carbon monoxide, 30 wt. % n-butyl-acrylate, and ethylene constituting the balance. As in Example 4, the grafting reaction was carried out in a Haake mixer at a temperature of about 225° C. and maximum rpm setting of about 200 rpm for about 1–2 minutes. Liquid chromatography indicated a still relatively high grafting level of 75%.

Toughness Tests

Two PVC formulations: 1) a control formulation with 10 parts EnBACO plasticizer (without any stabilizer) and 100 parts PVC; and 2) a formulation comprising 8.5 parts EnBACO plasticizer (without any stabilizer) and 1.5 parts grafted EnBACO of Example 4. The formulations were compression-molded at 190° C. at 40 M psi (2.8 M kgs/cm$^2$) for 4.5 minutes, and then cooled under pressure to obtain a thickness of 0.125 in (3.2 mm). The plaques were subjected to short-wave UV light in a QUV test for 7 days and 13 days, in cycles of 8 hours ultraviolet radiation exposure at 70° C. followed by 4 hours of condensing humidity at 50° C. These QUV evaluations were done in accordance with ASTM D 4587-86. The QUV® Tester was from Q-Panel Corp., Cleveland, Ohio.

Figure 4:
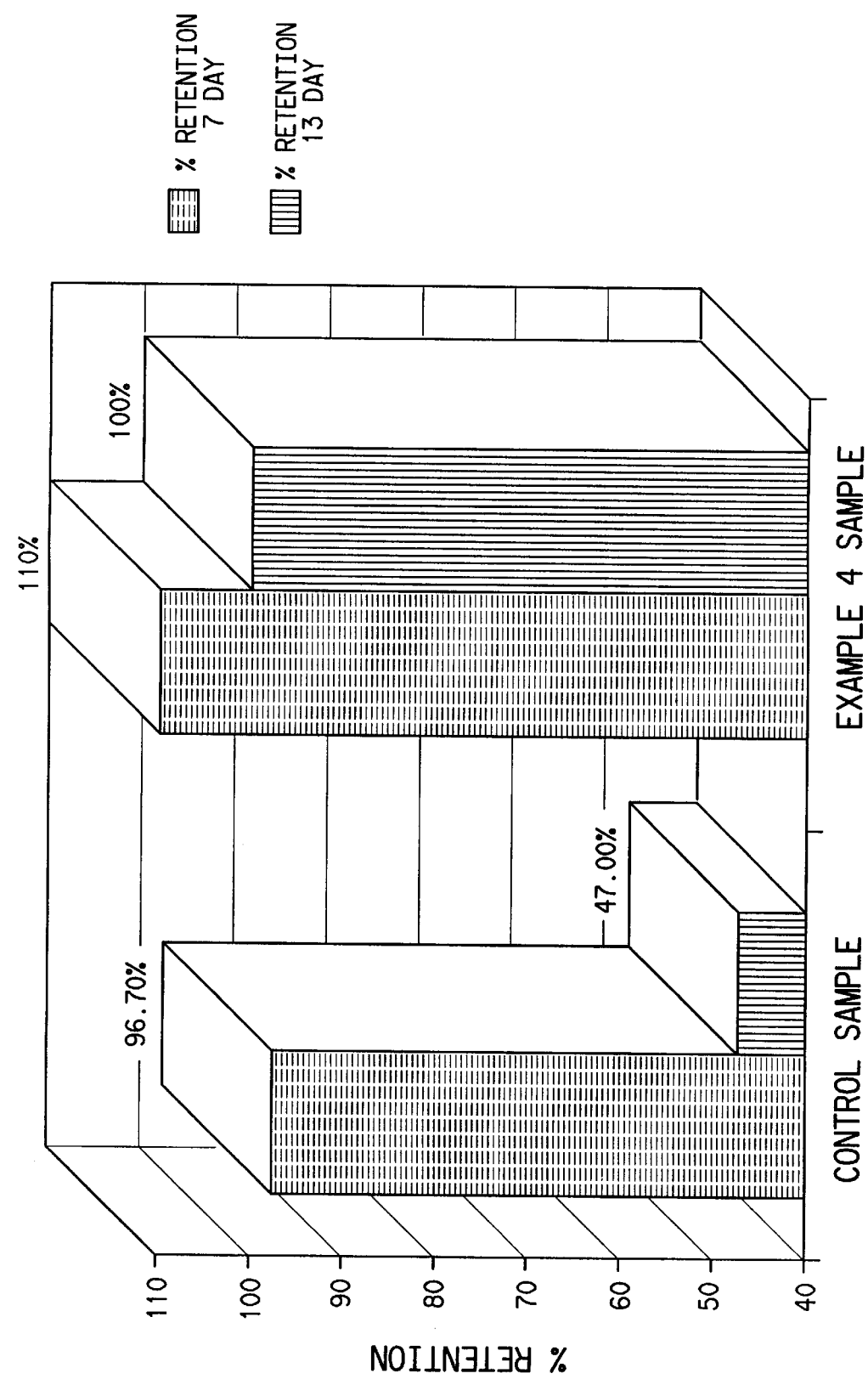
FIG. 4 is a plot illustrating the efficacy of copolymers of this invention in Gardner impact tests.

After the QUV evaluations, samples were then subjected to a toughness test as determined by the Gardner impact test. Gardner Impact values were determined by placing the compression-molded plaque on a plate over a 0.64 in (16.3 mm) diameter hole. A two-pound (0.91 kg) weight was dropped on an impact head having a 0.5 in (12.7 mm) radius tip resting on the plaque. The impact required to break the plaque was found by using 2 in. (51 mm) increments and is determined by recording the maximum pass value (highest impact value at which the plaque does not fail). The results of the impact tests comparing the control and grafted formulations may be seen in FIG. 4. After 7 days, the control sample without UV stabilizer retains 97% of its original toughness as determined by the Gardner Impact test. After 13 days, the Gardner Impact value goes down to 47% of its original figure. The formulation employing a plasticizer formulation grafted with 1.7 wt. % Norbloc® 7966 (Example 4) retained 100% original toughness after both 7 and 13 days exposure.

While this invention has been described with respect to various examples and embodiments, it is to be understood that the invention is not limited thereto and that it can be variously practiced within the scope of the following claims.

What is claimed is:

1. A novel plasticizer composition comprising:

(a) a copolymer of ethylene and carbon monoxide, and (b) a polymerizable ultraviolet radiation absorber selected from the group consisting of substances of the general formula I, II or III:

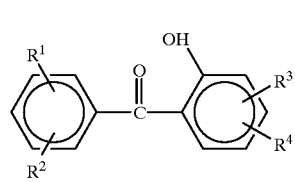
(I)

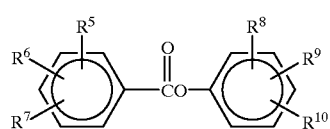
(II)

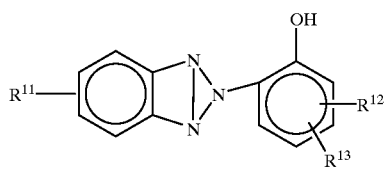
(III)

wherein:

i) at least one of $R^1$, $R^2$, $R^3$ and $R^4$ is an organic group having an unsaturated double bond, and the others are each a substituent group selected from the group consisting of an alkyl group, an aralkyl group, an aryl group, an aralkoxy group, an allyloxy group, a halogeno group, a sulfonic acid group, an ester of a sulfonic acid group, a carboxylic acid group, an ester of a carboxylic acid group, a phosphoric acid group and an ester of a phosphoric acid group;

ii) at least one of $R^5$, $R^6$ and $R^7$ is an organic group having an unsaturated double bond, and the others are each a substituent group selected from the group consisting of a hydrogen atom, an alkyl group, an alkenyl group, an aralkyl group, an aryl group, an alkoxy group, an aralkoxy group, an allyloxy group, a hydroxy group, a halogeno group, a sulfonic acid group, an ester of a sulfonic acid group, a carboxylic acid group, an ester of a carboxylic acid group, a phosphoric acid group and an ester of a phosphoric acid group;

iii) at least one of $R^8$–$R^{13}$ is an organic group having an unsaturated double bond, and the others are each a substituent group selected from the group consisting of a hydrogen atom, an alkyl group, an alkenyl group, an aralkyl group, an aryl group, an alkoxy group, an aralkoxy group, an allyloxy group, a hydroxy group, a halogeno group, a sulfonic acid group, an ester of a sulfonic acid group, a carboxylic acid group, an ester of a carboxylic acid group, a phosphoric acid group and an ester of a phosphoric acid group.

2. Articles for outdoor usage of the composition of claim 1.

3. The novel plasticizer composition of claim 1, wherein said copolymer of ethylene and carbon monoxide is selected from a group consisting of:

a. ethylene/alkyl acrylate/carbon monoxide copolymers;

b. ethylene/vinyl acetate/carbon monoxide copolymers;

c. ethylene/vinyl acetate/carbon monoxide copolymers grafted with carboxylic acid anhydride groups; and d. ethylene/alkyl acrylate/carbon monoxide copolymers grafted with carboxylic acid anhydride groups.

4. The novel plasticizer composition of claim 1, wherein said polymerizable ultraviolet radiation absorber is a 2-hydroxy-5-acryloxyalkylphenyl-2H-benzotriazole.

5. The novel plasticizer composition of claim 1, wherein said polymerizable ultraviolet radiation absorber is 2-(2'-hydroxy-5-methacrylyloxyethylpheny)-2H-benzotriazole.

6. The novel plasticizer composition of claim 1, wherein said polymerizable ultraviolet radiation absorber is present in an amount from about 0.05 to about 5 wt. %.

7. A method for incorporating a polymerizable ultraviolet radiation absorber into a copolymer of ethylene and carbon monoxide, said method comprising:

a. introducing a copolymerizable, reactable UV absorber selected from the group consisting of substances of the general formula I, II or III:

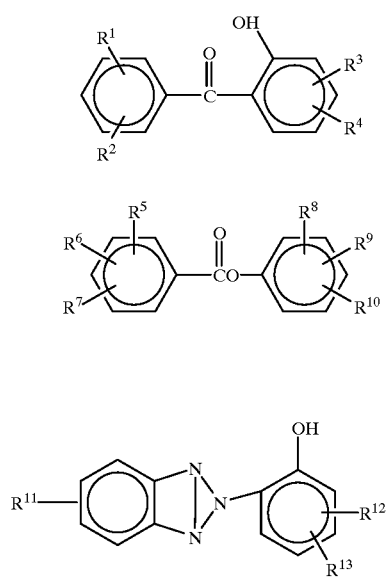

wherein:
i) at least one of $R^1$, $R^2$, $R^3$ and $R^4$ is an organic group having an unsaturated double bond, and the others are each a substituent group selected from the group consisting of an alkyl group, an aralkyl group, an aryl group, an aralkoxy group, an allyloxy group, a halogeno group, a sulfonic acid group, an ester of a sulfonic acid group, a carboxylic acid group, an ester of a carboxylic acid group, a phosphoric acid group and an ester of a phosphoric acid group;
ii) at least one of $R^5$, $R^6$ and $R^7$ is an organic group having an unsaturated double bond, and the others are each a substituent group selected from the group consisting of a hydrogen atom, an alkyl group, an alkenyl group, an aralkyl group, an aryl group, an alkoxy group, an aralkoxy group, an allyloxy group, a hydroxy group, a halogeno group, a sulfonic acid group, an ester of a sulfonic acid group, a carboxylic acid group, an ester of a carboxylic acid group, a phosphoric acid group and an ester of a phosphoric acid group;
iii) at least one of $R^8$–$R^{13}$ is an organic group having an unsaturated double bond, and the others are each a substituent group selected from the group consisting of a hydrogen atom, an alkyl group, an alkenyl group, an aralkyl group, an aryl group, an alkoxy group, an aralkoxy group, an allyloxy group, a hydroxy group, a halogeno group, a sulfonic acid group, an ester of a sulfonic acid group, a carboxylic acid group, an ester of a carboxylic acid group, a phosphoric acid group and an ester of a phosphoric acid group, into a copolymer of ethylene and carbon monoxide via free radical copolymerization, or alternatively, b. subjecting said reactable UV absorber component to conditions effective to chemically react said reactable UV absorber component with said previously prepared copolymer of ethylene and carbon monoxide and form a polymer material to which an effective amount of a UV absorber constituent derived from said reactable UV absorber is covalently bonded or grafted.

8. The method of claim 7, wherein said reactable UV absorber is present in molten mixture during at least a portion of said introducing.

9. The method of claim 8, further comprising the steps of shaping said molten mixture by injection molding, blow molding, extrusion or coextrusion, compression molding or vacuum forming.

10. Shaped articles produced by the process of claim 9 in the forms of tubes, sheets, films, packaging materials, pipes, rods, laminates, sacks, bags, molded goods, granules, or powders.

* * * * *